Feb. 8, 1927.

A. M. HAUGHT 1,617,249

WIRE FENCE

Filed Sept. 9, 1925

Austin M. Haught
INVENTOR

BY Victor J. Evans
ATTORNEY

WITNESS: Gerald Hennesy

Patented Feb. 8, 1927.

1,617,249

UNITED STATES PATENT OFFICE.

AUSTIN MILES HAUGHT, OF READER, WEST VIRGINIA.

WIRE FENCE.

Application filed September 9, 1925. Serial No. 55,369.

This invention relates to fences, particularly to those constructed of wire, and has for its object the provision of a novel fence embodying a stationary upper portion and a relatively movable lower portion formed preferably in detachably connected panels and movable to lie against the upper portion so as to leave the ground clear beneath the fence for the purpose of running a mowing machine, lawn mower or the like thereover for the purpose of trimming the grass or any other vegetation which may be growing along the fence.

An important object is the provision of a fence of this character which is particularly designed for use in fencing off yards, lawns, lots, cemeteries or the like, though of course capable for use on farms if such is desired.

Another object of the invention is to provide a fence of this character in which the panels or sections of the lower portions, which panels are detachably connected, may likewise be connected with fixed posts or the like whereby to be rigid and withstand impact of animals in case the fence is used on farms or other places where animals wander about.

An additional object is to provide a fence of this character which will be simple and inexpensive to manufacture, easy to construct and move, positive in action, efficient and durable in service, and a general improvement in the art.

Figure 1:
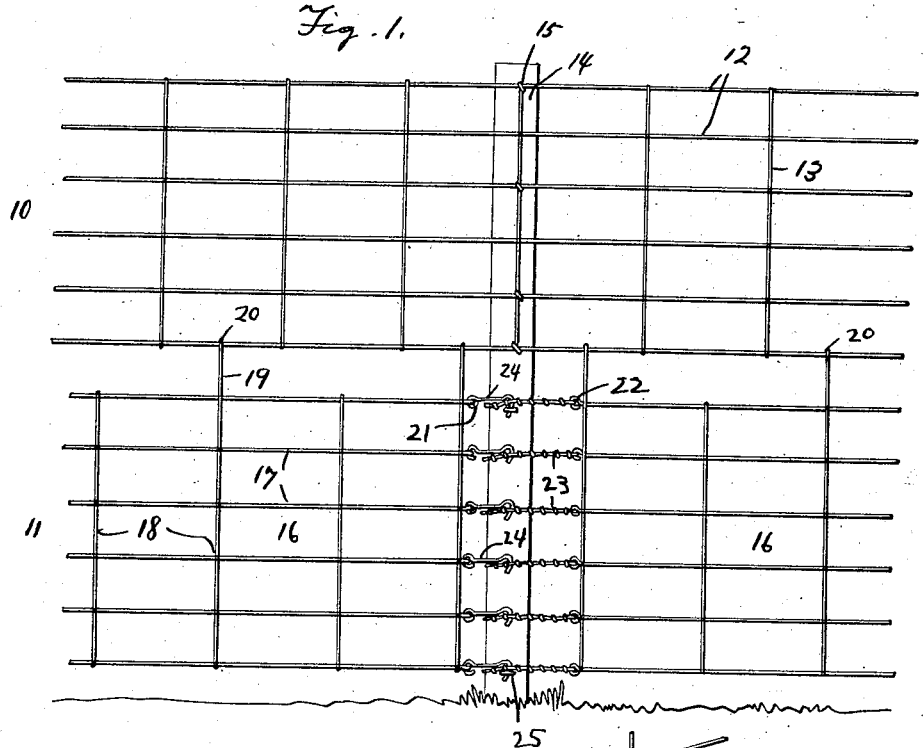
Figure 2:
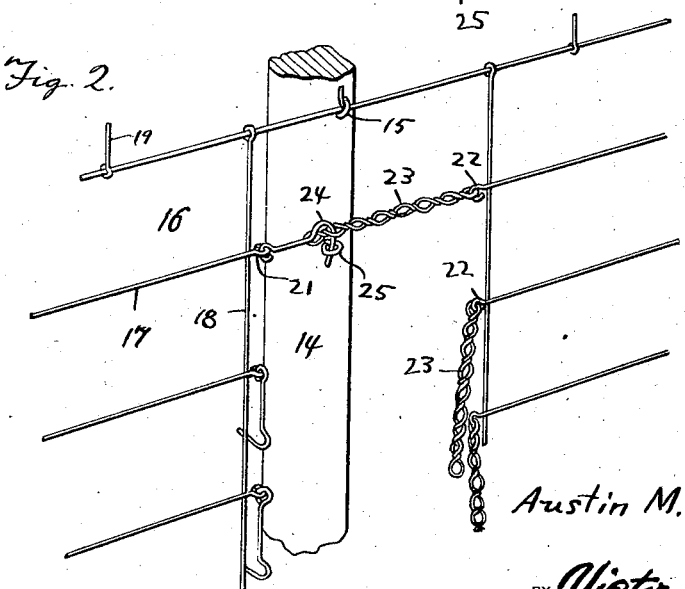

With the above and other objects and advantages in view, the invention consists in the details of construction, and the arrangement and combination of parts to be hereinafter more fully described and claimed, and illustrated in the accompanying drawings, in which:

Figure 1 is an elevation of a fence constructed in accordance with my invention, and Figure 2 is a detail fragmentary perspective view thereof.

Referring more particularly to the drawings, I have shown the fence as comprising two sections designated generally by the numerals 10 and 11, the former being the upper and the other being the lower portion of the fence. The upper section 10 may comprise any desired number of longitudinal and transverse strands 12 and 13 respectively, the strands being formed of wire and connected in any desired manner at the intersections, this wire being secured to a post 14 as for instance by means of staples or the like indicated at 15. The upper section 10 is located above the surface of the ground to any desired extent depending upon the contemplated width or height of the lower section 11.

The lower section 11 comprises a plurality of panels each of which is indicated by the numeral 16, these panels being of any desired length and width or height and being here represented as of construction similar to that of the upper section 10 of the fence. Each panel 16 is shown as including longitudinal wires 17 and transverse vertical wires 18 suitably secured thereto at the intersecting points. Certain or all of the transverse or vertical wires 18 are prolonged upwardly as indicated at 19 and terminate in hooks 20 which are engaged upon and clinched over the lowermost wire of the upper section 10 so as to define hinge elements which will provide a pivotal mounting for the panels 16 whereby they may be swung upwardly against the section 10 when desired. The ends of the horizontal wires 17 of the contiguous or adjacent sections 16 are formed with eyes or loops 21 and 22 and connected with the eyes 22 are short sections of chains 23 and pivotally connected to the eyes 21 are hooks 24 which are adapted to be engaged with selected links of the chains 23 for holding the adjacent panels in assembled relation. It is probably preferable to provide the posts 14 with staples or keepers 25 receiving the hooks 24 so that the panels 16 will be anchored with respect to the posts.

Assuming that the fence has been constructed as above described, and as illustrated in the drawings, it will be seen that the panels 16, constituting the lower section may be disconnected one from another and folded up to lie against the upper section 10, the panels being held in this elevated position by engaging any of the hooks 24 upon the wires of the section 10. Obviously, when this is done, free access may be had to the ground beneath the fence for the purpose of working it or cutting off any grass or other vegetation which may be thereon, the work being practically as easily accomplished as if there were no fence present. Obviously, there is no limitation as to the exact type of fence structure inasmuch as it need not be constructed of wire, though in actual practice, it is probably preferable that whatever design is used the panels constituting the lower section should correspond to those of the upper section in the matter of design for the sake of uniformity in appearance. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. A fence of the character described comprising the combination with upright fence posts, of an upper section of wire fence secured to the posts, and a lower wire section pivotally suspended from the upper section, and formed as a plurality of panels arranged in end to end relation, and means for detachably connecting the adjacent ends of the panels together and to the posts, comprising hook members mounted on one end of each panel, chains mounted on the end of the adjacent panel, selected links of the chains being engageable by the hooks, and keepers on the posts engageable by the hooks.

2. A fence of the character described comprising the combination with upright fence posts, of an upper section of fence secured to the posts, and a lower section pivotally suspended from the upper section, and formed as a plurality of panels arranged in end to end relation, and means for detachably connecting the adjacent ends of the panels, comprising hook members mounted on one end of each panel and chains mounted on the end of the adjacent panel, selected links of the chains being engageable by the hooks, said hooks and chains being located opposite a fence post, and staples projecting from the fence post and engageable by the hooks.

In testimony whereof I affix my signature.

AUSTIN MILES HAUGHT.